(12) United States Patent
Soppe et al.

(10) Patent No.: US 10,011,484 B1
(45) Date of Patent: Jul. 3, 2018

(54) PROCESS FOR PURIFYING RAW-MATERIAL GASES BY FRACTIONATION

(71) Applicants: Covestro Deutschland AG, Leverkusen (DE); Iris Bittner, Leverkusen (DE)

(72) Inventors: Alfred Soppe, Issum (DE); Juergen Bittner, Leverkusen (DE); Thorsten Leidig, Duisburg (DE); Friedhelm Steffens, Leverkusen (DE); Knud Werner, Krefeld (DE); Thomas Runowski, Hilden (DE)

(73) Assignee: COVERSTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/902,462

(22) Filed: Feb. 22, 2018

Related U.S. Application Data

(63) Continuation of application No. 14/891,986, filed as application No. PCT/CN2013/076056 on May 22, 2013, now Pat. No. 9,938,147.

(51) Int. Cl.
*C01B 7/07* (2006.01)
*C01B 7/075* (2006.01)

(52) U.S. Cl.
CPC ............ *C01B 7/0743* (2013.01); *C01B 7/075* (2013.01)

(58) Field of Classification Search
CPC .............................. C01B 7/0743; C01B 7/075
See application file for complete search history.

(56) References Cited

U.S. PATENT DOCUMENTS

| 8,048,203 B2 | 11/2011 | Ariki et al. |
| 8,512,447 B2 | 8/2013 | Doerr et al. |
| 2008/0260619 A1 | 10/2008 | Werner et al. |
| 2011/0144381 A1* | 6/2011 | Doerr .................... B01D 3/148 560/347 |
| 2012/0020866 A1 | 1/2012 | Brereton et al. |

FOREIGN PATENT DOCUMENTS

| CN | 101608872 A | 12/2009 |
| CN | 102527068 A | 7/2012 |
| CN | 102849681 | 1/2013 |
| WO | 2004018355 A1 | 3/2004 |

OTHER PUBLICATIONS

Smith, Cecil L.; "Reboilers and Feed Preheaters"; Distillation Control: An Engineering Perspective; First Edition; 2012; John Wiley & Sons, Inc.; vol. 26; pp. 180-208.

* cited by examiner

*Primary Examiner* — Cabrena Holecek
(74) *Attorney, Agent, or Firm* — Donald R. Palladino (57) ABSTRACT

The present invention relates to a process for purifying raw-material gases by fractionation. In particular, the present invention relates to a process for cleansing chlorine gas of bromine.

8 Claims, 3 Drawing Sheets

Fig. 3 (State of the art)

US 10,011,484 B1

PROCESS FOR PURIFYING RAW-MATERIAL GASES BY FRACTIONATION

CROSS-REFERENCE TO RELATED APPLICATION

This Application is a Continuation of U.S. Ser. No. 14/891,986, filed Nov. 18, 2015 which claims priority to National Phase Application of PCT/CN2013/076056, filed May 22, 2013, which are incorporated herein by reference.

BACKGROUND

When use is made of raw-material gases for the purpose of producing chemical products, the purity requirements placed on the respective raw-material gas are generally different from product to product.

For instance, chlorine is employed as raw material in the production of isocyanates or polycarbonate. Chlorine is usually contaminated with bromine, which in the case of the production of certain isocyanates has to be almost completely removed from the chlorine. The effort required for this is considerable, since bromine and chlorine can only be separated from one another with difficulty.

Processes for producing polycarbonate, on the other hand, are generally more tolerant with respect to the bromine content in the chlorine. In a chemical site chlorine is usually supplied from a common source of raw material, for example a raw-material storage tank, which provides the entire site via a network of pipes. Therefore the effort for purifying the chlorine has to be in line with the product having the highest purity requirement placed on the chlorine.

With reference to the process that is more bromine-tolerant, unnecessarily high expenditure is accordingly incurred, for this process is also supplied with clean chlorine. Moreover, some of the raw material, chlorine, is discarded together with the separated bromine, resulting in losses of raw material.

In the course of the purification of the raw material, chlorine, it is to be noted in addition that chlorine originating from electrolytic processes contains, more often than not, nitrogen trichloride ($NCl_3$) as high-boiling contaminant. Since $NCl_3$ is an explosive substance which at relatively high concentrations has a tendency towards spontaneous decomposition, the maximal concentration thereof in the chlorine has to be safely limited. Explosive substances in the sense of the present invention are $NCl_3$ and also all substances that have the GHS coding GHS01 (GHS, Globally Harmonized System of Classification and Labelling of Chemicals, adopted by the United Nations) and/or hazardous-materials Class 1 and/or 5.2 according to the European Agreement concerning the International Carriage of Dangerous Goods by Road (ADR). In particular, explosive substances in the sense of the invention are those of the aforementioned substances, which in comparison with the raw material to be purified are high-boiling, that is to say, have a lower vapour pressure under otherwise identical conditions.

In the course of a fractionation by means of distillation for the purpose of purifying chlorine, $NCl_3$ is enriched, in accordance with its low vapour pressure as a high-boiling component, at the bottom of the column together with bromine. At the head of the column the bromine-lean, low-boiling chlorine fraction is then drawn off.

Now if the demand for the bottom fraction is low, the fractionation is designed in such a way that only a small bottom stream and a correspondingly large head stream arise. This means, however, at the same time that the proportion of $NCl_3$ in the bottom fraction rises and may fall into a range that constitutes a safety risk.

If it is now desired to provide the bottom fraction likewise in gaseous form, said fraction has to be evaporated. In the course of this evaporation the lower-boiling components will at first pass over into the gas phase, and the high-boiling components will firstly remain in the liquid phase. In the process, the $NCl_3$ will be enriched still further in the remaining liquid phase, so that the safety risk rises further.

From the state of the art a number of processes for purifying chlorine are known, in the course of which bromine is removed.

For instance, EP 1 947 054 A1 discloses the separation of bromine from chlorine, wherein a stream of chlorine gas is conducted upwards from below through a wash column in which liquid chlorine charged at the top trickles towards said stream. The stream supplied at the bottom and the stream charged at the top must be in a ratio from 1/1 to 1/0.3. This process can be applied for the generation of a purified, bromine-lean stream of chlorine gas, and of a liquid bromine-rich stream of chlorine, the mass-flow ratio of these two streams being very restricted. Said process is therefore not suitable for the flexibility requirements of a modern chemical site. In addition, no description is given of how a gaseous stream can be generated from the stream of liquid. This, in itself, trivial step is very elaborate, by reason of stringent safety requirements, and has to be designed appropriately.

WO 2011/058069 A2 discloses a process for distillatory purification of a stream of chlorine. In this process, gaseous chlorine with less than 20 ppm bromine as a purified stream and also a liquid, bromine-containing stream of chlorine are generated. The process has been designed in such a way that the effort for pipelines and external condensers has been reduced. Moreover, additional safety is gained, since at the same time the holdup for liquid chlorine, bromine and $NCl_3$ is also reduced.

WO 2011/058069 A2, however, discloses neither a limitation in the ratio of the streams of chlorine supplied at the bottom and charged at the top, nor whether or how the liquid stream of chlorine can optionally be converted into a gaseous stream of chlorine.

WO 2004/018355 A1 discloses a process and a device in order to separate bromine from chlorine gas. The gas is routed into a distillation column from which a purified stream of chlorine gas is withdrawn as head product. The purified stream of gas is compressed and subsequently conducted into a condenser and partially liquefied. The condenser has been thermally integrated with the bottom evaporator of the distillation column. The liquid bromine-rich bottom stream out of the column is either purged or routed into a subsequent evaporator and evaporated.

The gaseous stream from this evaporator is purified further in a second distillation column. From the latter a highly bromine-containing stream of liquid is ejected from the bottom evaporator. At the head a stream of gas issues which is conducted back into the first column.

However, WO 2004/018355 A1 does not deal with the special safety problems in connection with the evaporation of an $NCl_3$-containing stream of chlorine.

SUMMARY

Proceeding from the disadvantages of the state of the art, the object therefore arises, namely to make available a process for cleansing a raw-material gas of undesirable components that have a higher boiling-point than the raw-material gas, a process that overcomes the disadvantages of the state of the art. In particular, in the case of the process according to the invention the purification effort is to be reduced in comparison with the state of the art, and the safety problems are to be avoided that result by virtue of the enrichment of an explosive substance or of several explosive substances in the stream of raw-material gas that has been enriched with the contaminants.

The object is achieved by a process with the features of claim 1. Further, preferred configurations are to be found in the dependent claims.

DETAILED DESCRIPTION

The present invention therefore provides a process for cleansing a raw material of contaminants by fractionation, with which a raw material is split up into a stream of gas with a high purity and a stream of gas with a low purity, the contaminants having a higher boiling-point than the raw material, and at least one of the contaminants being an explosive substance, characterised by the following steps:

I. a) complete evaporating of the raw material in a first evaporator to yield the raw-material gas,
or
b) partial evaporating of the raw material in a first evaporator to yield the raw-material gas,
or
c) making available a raw material gas from a supply source, II. introducing the raw-material gas into a wash column in which a washing liquid for diminishing the content of contaminants trickles towards said gas, III. withdrawal and partial condensation of the raw-material gas purified in this way at the head of the wash column, the condensate being conducted back as washing liquid towards the head of the wash column, and the remaining raw-material gas issuing from the wash column, said gas exhibiting a lower content of contaminants than the raw-material gas in step I, IV. issuing of the washing liquid as a stream of liquid at the bottom of the wash column, the washing liquid exhibiting a higher content of contaminants than in step II, V. introducing the washing liquid from above into the shell side of a second evaporator with horizontal tubes, the washing liquid entering there a tube bundle of the evaporator and being evaporated before it reaches the bottom of the evaporator, VI. guiding of the vapour generated from the washing liquid and of the not yet evaporated washing liquid in co-current flow, VI.a. optionally, in a preferred embodiment of the present invention, redirecting the vapour generated from the washing liquid by a baffle, said vapour thereby once again flowing through the second evaporator on the other side of said baffle, VII. issuing the vapour generated from the washing liquid from the second evaporator, in the preferred embodiment which includes step VI.a at the top of the second evaporator, as a stream of gas, said gas exhibiting a higher content of contaminants than the raw-material gas in step I.

In the alternative I. c), the raw-material gas employed in step II originates from a source that is different from the first evaporator, for example from a raw-material-gas store as supply source. Further examples of such supply sources would be the processes for producing the raw-material gas; in the case of chlorine as raw-material gas, for example chlorine-alkali electrolysis or the Deacon process. The first evaporator would no longer be necessary in these cases.

The co-current-flow guidance of vapour generated from the washing liquid and of not yet evaporated washing liquid in the second evaporator can also be obtained by the gas outlet having been arranged at the bottom in the evaporator or by evaporation in vertically arranged tubes where the generated vapour and the washing liquid are forced to stream co-currently from top to bottom by arranging the gas outlet at the bottom in the evaporator.

In this connection, by the term 'purification' in the sense of the present invention the reduction of the content of contaminant is to be understood.

In particular, in the case of the raw material it is a question of chlorine, and in the case of the contaminants it is a question of bromine and $NCl_3$, but the process is not restricted to these substances.

By virtue of the process according to the invention for purifying a raw-material gas by fractionation, a purified stream of raw-material gas with a low content of contaminants and a further stream of raw-material gas with a higher content of contaminants are generated by a fractionation according to the invention. The fractionation according to the invention is achieved by a two-step evaporation.

By virtue of the two-step evaporation, the purification effort is reduced, since the entire raw-material gas does not have to be purified. In addition, the process according to the invention covers a large range of the mass-flow ratio of raw-material gas with low content of contaminants and raw-material gas with high content of contaminants. Moreover, the process according to the invention is very flexible, since it is able to split the raw-material gas from step I, depending on the requirement, also into a very large proportion of purified raw-material gas according to step III and a correspondingly small proportion of raw-material gas with relatively high content of contaminants according to step VII. The ratio of stream of raw-material gas with low content of contaminants and stream of raw-material gas with high content of contaminants may lie within the range from 0.1 to 100, preferably from 0.1 to 10. This high flexibility has its roots in the mode of operation of the second evaporator, since by virtue of the co-current-flow guidance of the vapour of the washing liquid and of not yet evaporated washing liquid the enrichment of the explosive substances can be controlled there. Moreover, the safety problems that arise by virtue of the enrichment of explosive substances in the stream of raw-material gas with high content of contaminants are thereby avoided.

By virtue of the fractionation according to the invention, the raw material can be split up into two grades: with a low content of contaminants, and with a higher content of contaminants. In this connection the sizes of the two fractions are in line with the demand for raw material of the corresponding production process.

In a first embodiment of the invention, a liquid, contaminated raw material is withdrawn from a raw-material storage tank and is routed into a first evaporator in which it is evaporated completely and superheated. At this stage of the process, no fractionation occurs.

The now gaseous, still contaminated raw material is then routed into the lower part of a wash column where liquid raw material as washing liquid trickles towards it. The wash column may have been equipped with trays, with random or with structured packings. In the case where the entire gaseous, contaminated raw material is not to be purified, only part of it may be conducted into the wash column; the rest is then transmitted, directly after mixing with the stream of gas with a higher content of contaminants according to step VII, into the network of pipes for distributing the raw material. The washing liquid on the one hand cools the gaseous raw material to the dew-point and, on the other hand, takes up at least some of the contaminants, which have a higher boiling-point than the raw material, from the stream of raw-material gas. As a result, said stream is purified in the course of flowing through the column, and issues at the head of the column as gaseous raw-material fraction, by virtue of which the content of contaminants in this raw-material fraction is once again lower than that of the raw material prior to entering the wash column. The liquid raw material employed as washing liquid can be generated by condensation of some of the raw-material fraction with lower content of contaminants and can be charged at the head of the column. As a result, the remaining raw-material fraction, with lower content of contaminants, issuing in gaseous form from the condenser is purified further. But alternatively the washing liquid can also be supplied as a separate stream of liquid raw material, for example from the aforementioned raw-material storage tank. The gaseous raw-material fraction with lower content of contaminants from the column head or the remaining raw-material fraction, with lower content of contaminants, issuing from the condenser in gaseous form can be thermally integrated in a recuperator in this case with the gaseous raw material, which is conducted into the column at the bottom. As a result, the raw-material fraction with lower content of contaminants can be superheated, and the gaseous raw material entering the column can be cooled. This results in a reduction of the stream of washing liquid, and hence in an energetically and economically advantageous process. If the recuperator is integrated into the column, the space requirement for the construction of the wash column with its peripheral equipment, and hence the investment costs, can be additionally reduced.

The washing liquid is drawn off from the bottom of the column as a liquid raw-material fraction with relatively high content of contaminants, and is conducted from above into a second evaporator. In this evaporator the liquid trickles over the outer surface of horizontal, heated tubes and thereby evaporates. But it may also trickle inside vertically arranged tubes. The evaporator has been designed in such a way that the liquid raw material of the washing liquid has been evaporated completely before reaching the bottom of the evaporator. As a result, it is ensured that liquid raw material that is highly enriched with explosive substance or with explosive substances is at no place able to accumulate unchecked and become a safety risk. The evaporating raw material from the washing liquid is conducted in co-current flow with the not yet evaporated washing liquid, so that additionally no excessive fractionation and hence enrichment of explosive in the not yet evaporated liquid can occur by virtue of a possible counterflow guidance of vapour and liquid.

In order to enforce co-current-flow in the apparatus equipped with horizontal heated tubes, a baffle is preferably inserted into the apparatus. As a result, the vapour is guided into the bottom of the evaporator, routed around the baffle, and then flows on the other side thereof upwards through the tube bundle, is superheated, and leaves the evaporator on the upper side thereof. The baffle is preferably arranged in the bundle of tubes, i.e. it has gaps through which the tubes reach. In the case where the apparatus has been constructed with vertically arranged tubes, where washing liquid and vapour flow in the tubes from top to bottom the vapour is automatically guided into the bottom of the evaporator and can then be routed directly into an outlet nozzle situated at the bottom or can once again flow upwards through a separate part of the tubes, thereby being superheated, and can exit on the upper side of the apparatus.

In a second embodiment of the invention, liquid raw material is likewise withdrawn from a raw-material storage tank and is routed into a first evaporator but is only partially evaporated. On this evaporator a distillation column has been directly mounted, in which liquid raw material trickles towards the evaporated raw material. The distillation column may have been equipped with trays, with random or with structured packings. The remaining structure of the plant is identical to the description of the first embodiment of the invention.

In order to operate the fractionation, as far as possible, in energy-saving and hence resource-preserving manner, it may be reasonable to route only part of the gaseous raw material with relatively high content of contaminants into the wash column. The rest is directly bypassed to a means where it is mixed with the evaporated raw-material fraction with higher content of contaminants from the second evaporator and then sent into the network of pipes for the purpose of distribution of raw material. Since the raw-material fraction from the second evaporator has been routed through additional apparatuses in comparison with the residual gaseous raw material with higher content of contaminants, the loss of pressure arising in the process has to be compensated. To this end, use is made of the line between column bottom and inlet nozzle of the second evaporator. The column is arranged above the second evaporator, so that in the pipeline between column bottom and inlet nozzle of the second evaporator a liquid head can form which compensates for the loss of pressure.

Alternatively, the equalisation of pressure can also be obtained by a device for pressure reduction, which is incorporated into the line for the bypassed raw-material fraction with relatively high content of contaminants.

Alternatively, it is also possible to mix the bypassed portion of the gaseous raw material with the raw-material fraction with low content of contaminants from the column head or from the condenser outlet. As a result, although the purifying effect is counteracted, this may be reasonable if gas and liquid loading of the column are not to be changed and/or the purifying effect of the column is greater than necessary.

In the following, the invention will be elucidated by examples, without restricting it thereto.

EXAMPLES

Example 1

Figure 1:
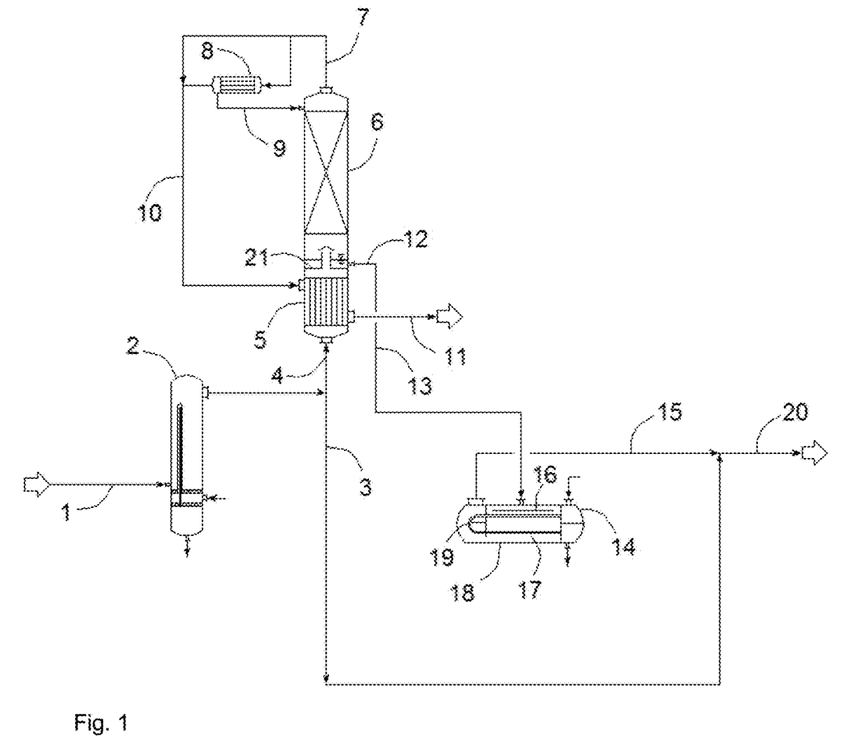
FIG. 1 is a schematic illustration of a process according to an embodiment of the present invention as described in Example 1.

In Example 1, on the basis of FIG. 1 the process according to the invention according to the first embodiment of the invention will be described, i.e. with complete evaporation of the liquid raw material in the first evaporator, the raw material being chlorine.

A liquid stream of chlorine 1, which contains bromine and $NCl_3$ as contaminants, is conducted into a first vapour-heated evaporator 2 equipped with bayonet tubes, is evaporated completely and superheated and issues as a then evaporated stream of chlorine 1, corresponding to stream of chlorine gas 1, from the evaporator 2. A portion 3 of the stream of chlorine 1, corresponding to stream of chlorine gas 3, is firstly branched off. The residual portion of the evaporated original stream of chlorine 1, corresponding to stream of chlorine gas 4, is routed into the tube side of a recuperator 5. The stream of chlorine gas 1 is split in such a way into stream of chlorine gas 3 and stream of chlorine gas 4 routed into the recuperator that the fractionation is operated, as far as possible, in energy-saving and hence resource-preserving manner. This is done by the stream of chlorine gas 4 being purified with the lowest possible quantity of washing liquid 9. This quantity is given by the maximal concentration of $NCl_3$ that can be tolerated for safety reasons in the bromine-laden and $NCl_3$-laden washing liquid 12 issuing from the column. In the recuperator 5 the stream of chlorine gas 4 is cooled and, after this, arrives at the wash column 6 in which liquid chlorine from the return flow 9, corresponding to washing liquid 9, trickles towards it. In this washing liquid 9 the low-volatile components bromine and $NCl_3$ are enriched, i.e. the content of contaminants in the washing liquid 9 increases. Wash column 6 and recuperator 5 have been directly mounted onto one another, representing a particularly economical solution as regards investment costs. They have been separated from one another by the chimney tray 21. The stream of chlorine gas 4 from the recuperator enters the column through the chimney; the washing liquid 9 that has trickled down is drawn off from the tray. For the purpose of improving the mass transfer, the wash column has been equipped with random or with structured packings or with trays. Said column has been designed in such a way that it removes the bromine from the stream of vapour in accordance with the requisite specification. The vapour as stream of chlorine gas 7 leaves the wash column at the head. In a condenser 8, portion 9 of the stream of chlorine gas 7 is condensed and as return flow or washing liquid 9 is again transmitted towards the wash column By virtue of the condensation in the condenser 8, a further purification of the non-condensed portion 10 of the stream of chlorine gas 7, corresponding to stream of chlorine gas 10, takes place. This stream of chlorine gas 10 is conducted into the shell side of the recuperator 5, is superheated by the stream of chlorine gas 4 flowing in the tubes, and is made available for a following process as chlorine-gas fraction 11 according to the requisite specification, and exhibits in comparison with the stream of chlorine gas 1 a lower content of bromine and $NCl_3$, that is to say, is leaner in contaminants in comparison with the stream of chlorine gas 1.

The bromine-laden and $NCl_3$-laden washing liquid 12 is collected in the bottom of the wash column on the chimney tray 21 and issues there. Since $NCl_3$ in a mixture with chlorine is distinctly less volatile than bromine, almost the entire $NCl_3$ passes out of the stream of chlorine gas 1 into the washing liquid 12. The laden washing liquid 12 is conducted via a pipeline into the second, vapour-heated evaporator 14. The wash column is arranged above the second evaporator, so that there is a height-difference between the chimney tray 21 and the second evaporator 14. The connecting pipeline therefore consists of a vertical piece 13 and has been linked by further pieces to the column and to the second evaporator 14. The laden washing liquid 12 is evaporated in the evaporator 14 and issues as bromine-rich chlorine gas 15, i.e. chlorine gas that has a higher content of bromine than the stream of chlorine gas 1.

Since, by reason of the energy-saving operation of the fractionation, the portion of bromine-lean and $NCl_3$-lean chlorine gas 11, which in comparison with the stream of chlorine gas 1 exhibits a low content of bromine and $NCl_3$, is large, and the portion of the laden washing liquid 12, which has been enriched with bromine and $NCl_3$, is small, the $NCl_3$ which has been almost completely enriched in the small bromine-rich and $NCl_3$-rich washing liquid 12 results in an elevated safety risk. If this stream of liquid chlorine, which the laden washing liquid 12 forms, is evaporated, the $NCl_3$ concentration in the liquid phase that is present until the evaporation is finished will rise further, since $NCl_3$ as high-boiling component preferentially remains in the liquid. In the course of the evaporation in apparatus 14, the special safety precautions described in the following are therefore taken.

The laden washing liquid 12 is conducted from above into the evaporator 14 and firstly impinges there on a perforated plate 16 which spreads the stream of the washing liquid 12 over the tube bundle 17 of the evaporator. The tube bundle 17 is to be designed in such a way that the entire stream has already been evaporated before it reaches the bottom 18 of the evaporator. As a result, it is ensured that a high $NCl_3$ concentration and a relatively large quantity of $NCl_3$-containing liquid never occur at the same place. Hence the safety risk in the course of the evaporation is reduced considerably. The evaporated stream is conducted by the baffle plate 19 in co-current flow to the not yet evaporated liquid, in order to prevent an excessive $NCl_3$ enrichment by an unchecked counterflow. After passing the baffle plate 19, the vapour again flows upwards and issues on the upper side of the evaporator 14 as bromine-rich chlorine gas 15.

The stream of chlorine gas 3 is mixed with this bromine-rich stream of chlorine gas 15 and then as bromine-rich gas fraction 20 is made available for a subsequent process.

Since the stream of chlorine gas 15 was conducted through more apparatuses than the stream of chlorine gas 3, the loss of pressure of the stream of chlorine gas 15 arising in the course of flowing through these apparatuses has to be compensated. To this end, the vertical piece 13 has been provided in the pipeline between column bottom and inlet into the second evaporator. In order to compensate for the loss of pressure, this vertical piece 13 is designed in such a way that the bromine-laden and $NCl_3$-laden washing liquid 12 drawn off from the column bottom is able to form a liquid head. The height of this liquid head then adapts itself in accordance with the loss of pressure to be compensated.

Example 2

Figure 2:
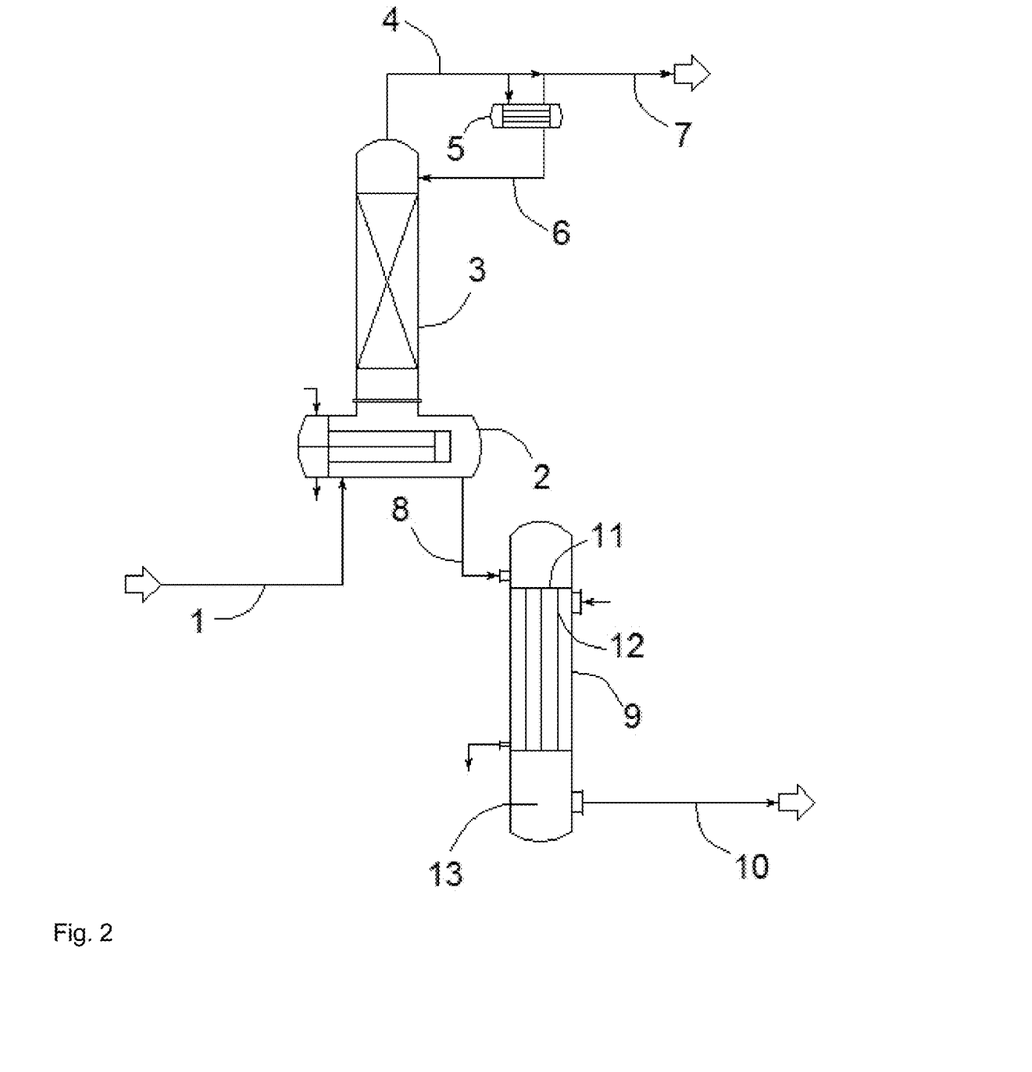
FIG. 2 is a schematic illustration of a process according to an embodiment of the present invention as described in Example 2.

In Example 2, on the basis of FIG. 2 the process according to the invention according to the second embodiment of the invention will be described, i.e. with partial evaporation of the liquid raw material in the first evaporator, corresponding to the first embodiment of the invention, the raw material being chlorine, and the following distillation column having been directly mounted onto the first evaporator.

A liquid stream of chlorine 1, which contains bromine and $NCl_3$ as contaminants, is conducted into a first, vapour-heated evaporator 2 and is partially evaporated. The then vaporous stream of chlorine 1, corresponding to stream of chlorine gas 1, is routed into the distillation column 3 located directly above the evaporator 2, in which liquid chlorine as washing liquid 6 trickles towards it. Thereby, the low-volatile components bromine and $NCl_3$ are enriched in the washing liquid 6. To improve mass transfer, the distillation column 3 has been equipped with random or with structured packings or with trays. Said column has been designed in such a way that it removes the bromine from the stream of chlorine gas 1 in accordance with the requisite specification. The vapour as stream of chlorine gas 4 leaves the distillation column 3 at the head. In a condenser 5 some of the stream of chlorine gas 4 is condensed and is transmitted as return flow 6 towards the distillation column 3. This return flow 6 forms the washing liquid 6 and trickles as liquid in the distillation column 3 towards the rising stream of chlorine gas 1. By virtue of the condensation in the condenser, a further purification of the remaining stream of chlorine gas 7 takes place. Said stream is made available as chlorine-gas fraction 7 according to the requisite specification for a following process and exhibits in comparison with the stream of chlorine gas 1 a lower content of bromine and $NCl_3$.

The bromine-laden and $NCl_3$-laden liquid 8 issues from the bottom of the evaporator 2. Since $NCl_3$ in a mixture with chlorine is distinctly less volatile than bromine, almost the entire $NCl_3$ from the stream of chlorine gas 1 passes into the stream of liquid chlorine 8. This is evaporated in a subsequent, vapour-heated falling-film evaporator 9 and is made available as bromine-rich chlorine-gas fraction 10 for a subsequent process.

Now if a large portion of bromine-lean chlorine, that is to say, chlorine with a lower content of bromine than the stream of chlorine gas 1, and a small portion of bromine-rich chlorine, that is to say, chlorine with a higher content of bromine than the stream of chlorine 1, is demanded by the chlorine-consuming processes, the entire $NCl_3$ is enriched in the small, bromine-rich chlorine fraction 8, resulting in an elevated safety risk. If this stream of liquid chlorine 8 is evaporated, the $NCl_3$ concentration in the liquid phase that is present until the evaporation is finished will rise further, since $NCl_3$ as high-boiling component preferentially remains in the liquid. In the course of the evaporation in the falling-film apparatus 9, the special safety precautions described in the following are therefore taken.

The stream of liquid chlorine 8 is conducted from above into the evaporator 9 and is distributed there firstly to the upper tube sheet 11 which distributes the stream of liquid chlorine 8 to the tubes 12. The tubes 12 should be designed in such a way that the entire stream has already been evaporated before it reaches the bottom 13 of the evaporator 9. As a result, it is ensured that a high $NCl_3$ concentration and a relatively large quantity of $NCl_3$-containing liquid never occur at the same place. Hence the safety risk in the course of the evaporation is reduced considerably. The evaporated stream of chlorine 8 is conducted in the tubes 12 in co-current flow to the not yet evaporated liquid, so that $NCl_3$ is not excessively enriched. In the bottom the chlorine vapour flows to the outlet nozzle and leaves the evaporator 9 as bromine-rich chlorine-gas fraction 10.

Comparative Example 3

Figure 3:
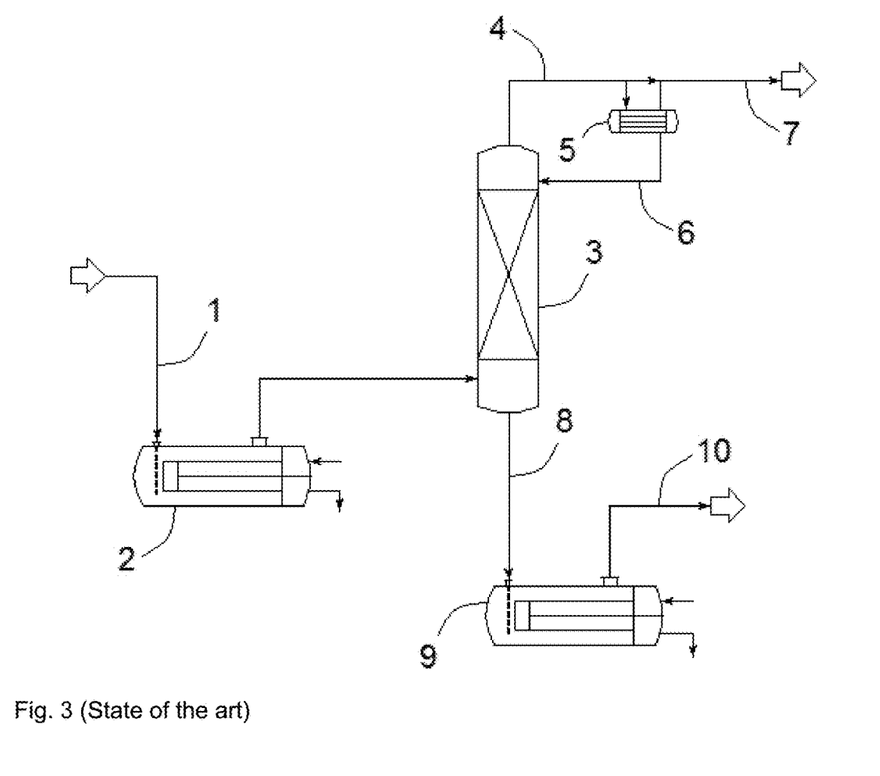
FIG. 3 is a schematic illustration of a process from the state of the art as described in Comparative Example 3.

In this comparative example, on the basis of FIG. 3 a process from the state of the art will be described, in which liquid chlorine is conducted into an evaporator and the gaseous chlorine arising is subsequently conducted into a distillation column. The residual liquid chlorine is evaporated in a conventional evaporator, so that a high $NCl_3$ concentration and a relatively large quantity of liquid chlorine occur at the same place.

A liquid stream of chlorine 1, which contains bromine and $NCl_3$ as contaminants, is conducted into a first, vapour-heated evaporator 2 and is evaporated completely. The vaporous stream of chlorine 1 arising in the process, corresponding to stream of chlorine gas 1, is routed into a wash column 3 in which liquid chlorine as washing liquid 6, which corresponds to the return flow 6, trickles towards it. In the process, the low-volatile components bromine and $NCl_3$ are enriched in the washing liquid 6. For the purpose of improving the mass transfer, the wash column 3 has been equipped with random or with structured packings or with trays. Said column has been designed in such a way that it removes the bromine from the stream of chlorine gas 1 in accordance with the requisite specification. The stream of chlorine gas 1 then leaves the wash column 3 at the head as chlorine gas stream 4. In a condenser 5 some of the stream of chlorine gas 4 is condensed and as return flow 6, corresponding to washing liquid 6, is transmitted towards the wash column 3. By virtue of the condensation, a further purification of the remaining stream of chlorine gas 7 takes place. The latter is made available as chlorine-gas fraction 7 according to the requisite specification for a following process, and exhibits in comparison with the stream of chlorine gas 1 a lower content of bromine and $NCl_3$.

The bromine-laden and $NCl_3$-laden washing liquid, corresponding to stream of liquid chlorine 8, issues in the bottom of the wash column. Since $NCl_3$ in a mixture with chlorine is distinctly less volatile than bromine, almost the entire $NCl_3$ passes out of the stream of chlorine gas 1 into the stream of liquid chlorine 8. The latter is evaporated in a subsequent, vapour-heated tube-bundle evaporator 9 and is made available as bromine-rich chlorine-gas fraction 10 for a subsequent process.

Now if a large portion of bromine-lean chlorine and a small portion of bromine-rich chlorine are demanded by the chlorine-consuming processes, the entire $NCl_3$ in the small, bromine-rich chlorine fraction is accumulated into the stream of liquid chlorine 8, resulting in an elevated safety risk. If the stream of liquid chlorine 8 is evaporated, the $NCl_3$ concentration in the liquid phase that is present until the evaporation is finished will rise further, since $NCl_3$ as high-boiling component preferentially remains in the stream of liquid chlorine 8. Since the tube bundle of the evaporator 9 has to be covered with boiling chlorine in order to provide the evaporation capacity, the evaporator 9 is always filled with liquid chlorine. Consequently, in an evaporator constructed and operated in accordance with the state of the art a high $NCl_3$ concentration and a large quantity of chlorine occur at the same place. This constitutes a particularly high safety risk, which is diminished by the process according to the invention.

The invention claimed is:

1. A process for cleansing a raw material having a content of contaminants by fractionation, with which a raw material is split up into a stream of gas with a high purity and a stream of gas with a low purity, the contaminants having a higher boiling-point than the raw material, and at least one of the contaminants being an explosive substance, comprising:

I. evaporating the raw material in a first evaporator to yield a raw-material gas, or making available a raw-material gas from a supply source, II. introducing the raw-material gas into a wash column in which a washing liquid for diminishing the content of contaminants trickles towards said gas, III. removing and partially condensing the raw-material gas purified in this way at the head of the wash column to form a condensate that is returned as washing liquid to the head of the wash column, and drawing off remaining raw-material gas from the wash column, the remaining raw-material gas having a lower content of contaminants than the raw-material gas yielded or made available in step I, IV. removing the washing liquid as a stream of liquid at the bottom of the wash column, the washing liquid having a higher content of contaminants than the washing liquid used in step II, V. introducing the washing liquid removed from the bottom of the wash column into the top of a second evaporator comprising vertically arranged tubes, wherein the washing liquid removed from the bottom of the wash column flows in the tubes from top to bottom and completely evaporates before reaching the bottom of the second evaporator to generate a vapour, VI. guiding the vapour and not yet evaporated washing liquid in co-current flow through the tubes in the second evaporator, and VII. removing the vapour from the second evaporator as a stream of gas that exhibits a higher content of contaminants than the raw-material gas yielded or made available in step I.

2. The process of claim 1, wherein the raw material is evaporated completely to yield the raw-material gas.

3. The process of claim 1, wherein in step V the vapour that is generated is drawn off below in the bottom.

4. The process of claim 1, wherein in step V the washing liquid removed from the bottom of the wash column is routed only through one part of the tubes of the second evaporator and after redirection does not issue in the bottom but again flows upwards through the other part of the tubes, is thereby superheated, and issues from the second evaporator at the top.

5. The process of claim 1, wherein the raw material is chlorine and the contaminants are bromine and $NCl_3$.

6. The process of claim 1, wherein prior to entering the wash column the raw-material gas is routed through a recuperator in which it is cooled, and on the other side of the recuperator the purified stream of gas remaining after condensation at the head of the wash column is conducted and superheated.

7. The process of claim 1, wherein the wash column is arranged above the second evaporator, the raw-material gas from the first evaporator is conducted only partly into the wash column and into the recuperator, whereas the residual portion of the raw-material gas is mixed directly with the stream of gas of low purity from the second evaporator, the loss of pressure of the stream of gas of low purity that arises in the course of flowing through the apparatuses being compensated by a liquid-filled vertical section of the connecting line between column bottom and second evaporator.

8. The process of claim 1, wherein the raw material in the first evaporator is only partially evaporated, and the evaporated portion of the raw material is routed into the wash column and into the recuperator, the washing liquid trickling towards it in the column is routed into the first evaporator and from there, together with the non-evaporated portion of the raw material, arrives at the second evaporator.

* * * * *

UNITED STATES PATENT AND TRADEMARK OFFICE
CERTIFICATE OF CORRECTION

PATENT NO. : 10,011,484 B1
APPLICATION NO. : 15/902462
DATED : July 3, 2018
INVENTOR(S) : Alfred Soppe et al.

It is certified that error appears in the above-identified patent and that said Letters Patent is hereby corrected as shown below:

On the Title Page

Item (73), delete the name:
"COVERSTRO DEUTSCHLAND AG"

And insert therefor:
-- COVESTRO DEUTSCHLAND AG --

Signed and Sealed this
Twenty-eighth Day of August, 2018

Andrei Iancu
*Director of the United States Patent and Trademark Office*